(12) United States Patent
Bao et al.

(10) Patent No.: US 12,054,104 B2
(45) Date of Patent: Aug. 6, 2024

(54) WIDE-ANGLE LENS, CAMERA MODULE AND VEHICLE CAMERA

(71) Applicant: JIANGXI LIANCHUANG ELECTRONIC CO., LTD., Nanchang (CN)

(72) Inventors: Yumin Bao, Nanchang (CN); Xuming Liu, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 976 days.

(21) Appl. No.: 16/858,636

(22) Filed: Apr. 26, 2020

(65) Prior Publication Data
US 2020/0254941 A1     Aug. 13, 2020

Related U.S. Application Data

(63) Continuation of application No. PCT/CN2019/113101, filed on Oct. 24, 2019.

(30) Foreign Application Priority Data

Dec. 12, 2018 (CN) .......................... 201811522963.2

(51) Int. Cl.
*G02B 13/06*     (2006.01)
*B60R 11/04*     (2006.01)
(Continued)

(52) U.S. Cl.
CPC ................ *B60R 11/04* (2013.01); *G02B 9/62* (2013.01); *G02B 13/002* (2013.01);
(Continued)

(58) Field of Classification Search
CPC ........... B60R 11/04; G02B 9/62; G02B 13/06; G02B 13/18; G02B 13/002; G02B 13/0045; G02B 1/00; H04N 23/51; H04N 23/55
See application file for complete search history.

(56) References Cited

U.S. PATENT DOCUMENTS 5,148,320 A * 9/1992 Toide ..................... G02B 13/16
                                                                                    359/713
5,504,628 A * 4/1996 Borchard ............... G02B 13/14
                                                                                    359/558
(Continued)

FOREIGN PATENT DOCUMENTS

CN          1255631 A      6/2000
CN     101029958 A      9/2007
(Continued)

OTHER PUBLICATIONS

Takesuke Maruyama et al., Zoom Lens Systems with Aspherical Plastic Lens, CE-33 IEEE Transactions on Consumer Electronics 256-266 (1987). (Year: 1987).*

(Continued)

*Primary Examiner* — Cara E Rakowski
*Assistant Examiner* — Wesley Scott Ashton (57) ABSTRACT

The disclosure provides wide-angle lens, an imaging device, a camera module and a vehicle camera. From an object side to an image side, the wide-angle lens sequentially includes: a first lens group with a refractive power, wherein the first lens group includes a first lens with a negative refractive power, a second lens with a negative refractive power and a third lens with a positive refractive power from the object side surface to the image side surface; a second lens group with a positive refractive power, wherein the second lens group includes a fourth lens with a negative refractive power, a fifth lens with a positive refractive power and a (Continued)

sixth lens with a positive refractive power; and a stop disposed between the first lens group and the second lens group.

15 Claims, 6 Drawing Sheets

(51) Int. Cl.
 G02B 9/62 (2006.01)
 G02B 13/00 (2006.01)
 H04N 23/51 (2023.01)
 H04N 23/55 (2023.01)
(52) U.S. Cl.
 CPC ......... *G02B 13/0045* (2013.01); *G02B 13/06* (2013.01); *H04N 23/51* (2023.01); *H04N 23/55* (2023.01)

(56) References Cited

U.S. PATENT DOCUMENTS

| | | | | |
|---|---|---|---|---|
| 5,909,308 | A * | 6/1999 | Ulrich | G02B 13/14 |
| | | | | 359/356 |
| 6,268,885 | B1 * | 7/2001 | Ohta | G02B 7/102 |
| | | | | 396/97 |
| 6,865,318 | B1 * | 3/2005 | Hayden | G02B 1/02 |
| | | | | 501/48 |
| 7,633,688 | B2 * | 12/2009 | Kamo | G02B 13/0095 |
| | | | | 359/740 |
| 7,782,551 | B2 * | 8/2010 | Hsu | G02B 13/06 |
| | | | | 359/753 |
| 9,632,288 | B2 * | 4/2017 | Asami | G02B 13/0045 |
| 9,864,166 | B2 * | 1/2018 | Mori | G02B 13/0045 |
| 11,125,971 | B2 * | 9/2021 | Chen | H04N 23/55 |
| 11,353,687 | B2 * | 6/2022 | Chen | G02B 13/0045 |
| 11,467,374 | B2 * | 10/2022 | Ikeo | H04N 23/67 |
| 11,550,124 | B2 * | 1/2023 | Bao | G02B 13/002 |
| 2017/0038564 | A1 * | 2/2017 | Kuo | H04N 9/315 |
| 2017/0314917 | A1 * | 11/2017 | Murata | G01C 3/06 |
| 2018/0356613 | A1 * | 12/2018 | Chen | G02B 7/04 |
| 2020/0218036 | A1 * | 7/2020 | Liu | G02B 13/0035 |

FOREIGN PATENT DOCUMENTS

| | | | | |
|---|---|---|---|---|
| CN | 101762866 | A | 6/2010 | |
| CN | 104423022 | A | 3/2015 | |
| CN | 204302561 | U | 4/2015 | |
| CN | 205157867 | U | 4/2016 | |
| CN | 206115006 | U | 4/2017 | |
| CN | 107209348 | A | 9/2017 | |
| CN | 108051899 | A | 5/2018 | |
| CN | 207571372 | U | 7/2018 | |
| CN | 108363160 | A | 8/2018 | |
| CN | 108427184 | A | 8/2018 | |
| CN | 108490589 | A | 9/2018 | |
| CN | 108535834 | A | 9/2018 | |
| CN | 108663785 | A | 10/2018 | |
| CN | 109407279 | A | 3/2019 | |
| JP | 2012093397 | A | 5/2012 | |
| KR | 101183188 | B1 | 9/2012 | |
| WO | WO-2007145194 | A1 * | 12/2007 | ........... G02B 15/173 |
| WO | WO-2016176911 | A1 * | 11/2016 | |
| WO | WO-2017204364 | A1 * | 11/2017 | ............ G02B 13/04 |
| WO | 2018066641 | A1 | 4/2018 | |
| WO | WO-2018066641 | A1 * | 4/2018 | ............ G02B 13/04 |

OTHER PUBLICATIONS

Alex Ning, Plastic vs. Glass Optics: Factors to Consider, 1998, pp. 1-9 [online], [retrieved Jul. 10, 2023], retrieved from Internet <URL: file:///C:/Users/washton/Documents/Applications/16-858636%20(wide-angle%20lens,%20camera%20module%20and%20vehicle%20camera)/Technology/Ning,%20Plastic%20vs.%20 . . . >. (Year: 1998).*
Focal Lengths, Apertures and F/Numbers, 2016, pp. 1-2 [online], [retrieved May 3, 2023], retrieved from the Internet <URL: https://spacemath.gsfc.nasa.gov/weekly/10Page30.pdf>. (Year: 2016).*
Bjorn Petersen, Optical Anomalies and Lens Corrections Explained, 2016, pp. 1-17 [online], [retrieved Jul. 11, 2023], retrieved from the Internet <URL: https://www.bhphotovideo.com/explora/photography/tips-and-solutions/optical-anomalies-and-lens-corrections-explained>. (Year: 2016).*
Is a Aspherical Camera Lens Better than a Spherical Lens?, 2018, pp. 1-3 [online], [retrieved Jul. 11, 2023], retrieved from the Internet <URL: web.archive.org/web/20180814192523/http://www.hypoptics.com/about-us/resources/is-ashperical-camera-lens-better-than-spherical.html>. (Year: 2018).*
Machine English Translation (MET) of the specification and claims of CN 108663785 A, obtained from Patent Translate, with copy of CN 108663785 and Espacenet Bibiographic Data attached. (Year: 2023).*
Machine English Translation (MET) of the specification and claims of CN 108427184 A, obtained from Patent Translate, with copy of CN 108427184 A and Espacenet Bibiographic Data attached. (Year: 2023).*
Yongjian Zhu et al., A Novel Optical Design for Car-camera Lenses, 7787 Proceedings of SPIE 77870V-1 to 77870V-7 (2010). (Year: 2010).*
M. Damghanian et al., Depth and Angular Resolution in Plenoptic Cameras, 2015 IEEE International Conference on Image Processing (ICIP) 3044-3048 (2015). (Year: 2015).*
Günther KH Zupanc, Sharp Eyes: How Well Can We Really See?, 37 Science in School 29-33 (2016). (Year: 2016).*
C. Bond, Lensmaker's Formula, 2017, 11. 1-3 [online], [rerieved Jun. 28, 2023], retrieved from the Internet <URL: https://crbond.com/papers/lensmaker.pdf>. (Year: 2017).*
Andy Rowlands, Physics of Digital Photography, Chapter 1, 2017, pp. 1-1 to 1-62 [online], [retreived [Nov. 2, 2023], retrieved from Internet <URL: https://iopscience.iop.org/book/mono/978-0-7503-1242-4/chapter/bk978-0-7503-1242-4ch1.pdf>. (Year: 2017).*
Thomas H. Jamieson, Thermal Effects in Optical Systems, 20 Optical Engineering 156-160 (1981). (Year: 1981).*
A. Steimacher et al., The Temperature Coefficient of the Optical Path Length as a Function of the Temperature in Different Optical Glasses, 348 Journal of Non-Crystalline Solids 240-244 (2004),. (Year: 2004).*
SIPO, Third Office Action For CN Application No. 201811522963.2, Mar. 1, 2021.
China Search Report issued in corresponding China application No. 201811622963.2, mailed Jan. 22, 2020(15 pages).
International Search Report issued in corresponding international application No. PCT/CN2019/113101, mailed Jan. 23, 2020(8 pages).
Written opinion of the International Search Authority issued in corresponding international application No. PCT/CN2019/113101, mailed Jan. 23, 2020(7 pages).
Book of "Optical Design Tutorial(Version 2)"HuangYiFan etc,p. 238-240, Beijing Institute of Technology Press, mailed Aug. 31, 2018,(6 pages).
SIPO, Office Action issued for CN Application No. 201811522963.2, Jul. 12, 2021.
SIPO, Second Office Action for CN Application No. 2018115229632, Aug. 27, 2020.

* cited by examiner

Normalized Pupil Coordinate

FIG. 9

Field (Deg)

FIG. 13

WIDE-ANGLE LENS, CAMERA MODULE AND VEHICLE CAMERA

CROSS REFERENCE TO RELATED APPLICATION(S)

This application is a continuation of International Application No. PCT/CN2019/113101, filed on Oct. 24, 2019, titled "WIDE-ANGLE LENS AND IMAGING DEVICE". The International Application No. PCT/CN2019/113101 claims priority to a Chinese application No. 2018115229632, filed on Dec. 12, 2018, titled "WIDE-ANGLE LENS AND IMAGING DEVICE". The entirety of the above-mentioned application is hereby incorporated by reference herein.

TECHNICAL FIELD

The disclosure relates to the field of camera lens technologies, and more particularly, to a wide-angle lens, an imaging device, a camera module, and a vehicle camera.

BACKGROUND

With the development of automatic driving, vehicle lenses, as key components of automatic driving assistance systems, are developing rapidly, and the requirements for these lenses are becoming higher and higher.

Compared with ordinary optical lenses, the vehicle lens of the automatic driving assistance system has special requirements. For example, the vehicle lens requires that, a front port diameter as small as possible, a strong light transmission ability, a adaptability to the light and dark changes in the external environment, a relatively high imaging clarity which can effectively distinguish details of the external environment, a good thermal stability which makes the vehicle lens have a good resolution at high and low temperatures, thereby meeting the special requirements of automatic driving.

SUMMARY

In view of the above problems, the disclosure provides a wide-angle lens, an imaging device, a camera module, and a vehicle camera, having the advantages of high imaging quality and good thermal stability.

An embodiment of the disclosure provides a wide-angle lens. From an object side to an image side along an optical axis, the wide-angle lens sequentially includes: a first lens group with a refractive power, wherein the first lens group includes a first lens with a negative refractive power, a second lens with a negative refractive power and a third lens with a positive refractive power from the object side surface to the image side surface; a second lens group with a positive refractive power, wherein the second lens group includes a fourth lens with a negative refractive power, a fifth lens with a positive refractive power and a sixth lens with a positive refractive power, a stop disposed between the first lens group and the second lens group; wherein the first lens, the second lens, the third lens, the fourth lens, the fifth lens and the sixth lens each are glass lenses, and the optical center of every lens is located on the same straight line.

Further, the wide-angle lens meets the expression: $-10<(\varphi_2/\varphi_1)<6$, where $\varphi_2$ represents a refractive power of the second lens, $\varphi_1$ represents a refractive power of the first lens group.

Further, the wide-angle lens meets the expression: $-15 \times 10^{-6}/°C.<(dN/dT)_2+(dN/dT)_6<2\times10^{-6}/°C.$, where $(dN/dT)_2$ represents a temperature coefficient of refractive index of the second lens, $(dN/dT)_6$ represents a temperature coefficient of refractive index of the sixth lens.

Further, the wide-angle lens meets the expression: $0.3<\varphi_{II}/\varphi<0.8$, where $\varphi_{II}$ represents a refractive power of the second lens group, $\varphi$ represents a refractive power of the wide-angle lens.

Further, the wide-angle lens meets the expression: $-0.1<\varphi_2/r_{21}<0$, where $\varphi_2$ represents a refractive power of the second lens, $r_{21}$ represents a radius of curvature of an object side surface of the second lens.

Further, the wide-angle lens meets the expression: $0 \leq (|\Delta IH/\Delta\theta|_{max}-|\Delta IH/\Delta\theta|_{min})/(f^*\tan(\Delta\theta)) \leq 0.25$, where $\Delta IH$ represents a change of image height of the wide-angle lens, $\Delta\theta$ represents a change of half-FOV of the wide-angle lens, $|\Delta IH/\Delta\theta|_{max}$ represents the maximum angular resolution, $|\Delta IH/\Delta\theta|_{min}$ represents the minimum angular resolution, f represent an effective focal length of the wide-angle lens.

Further, the first lens, the second lens, the third lens, the fourth lens, and the fifth lens each are spherical lenses, the sixth lens is an aspherical lens.

Further, the fourth lens is a bi-concave lens, the fifth lens is a bi-convex lens, an object side surface of the sixth lens is convex.

Further, an F number of the wide-angle lens is not greater than 1.8.

Further, a field of view (FOV) of the wide-angle lens is between 80°-140°.

Further, a total optical length of the wide-angle lens is less than 23 mm.

The disclosure further provides an imaging device, which includes the wide-angle lens provided in any one of the foregoing embodiments and an imaging element for converting an optical image formed by the wide-angle lens into electrical signals.

The disclosure further provides a camera module, which includes the wide-angle lens as mentioned above, a barrel, a holder and an image sensor. The wide-angle lens is received in the barrel, and the barrel is engaged with the holder. The image sensor is substantially accommodated in the holder and opposite to the wide-angle lens. The image sensor is configured for converting light signals into electrical signals, thereby the images formed by the wide-angle lens can be converted and transmitted to a processor.

The disclosure provides a vehicle camera, which includes a camera module as mentioned above, a processor, and a memory, wherein the camera module is configured to capture images, the processor is configured to process the captured images, and the memory is configured to store the captured images.

Compared with the prior art, the wide-angle lens and the imaging device provided by this application have the characteristics of high imaging quality and good thermal stability. The first lens group is mainly used for correcting f-θ distortion of the wide-angle lens, and the second lens group is mainly used for correcting astigmatism thereby improving the resolution of the wide-angle lens. In addition, the first lens, the second lens, the third lens, the fourth lens, the fifth lens, and the sixth lens of the wide-angle lens are all glass lenses, due to the stable performance of the glass lenses, it can achieve the athermalization over a wide temperature range. The wide-angle lens of this application can clearly image in a temperature range of −40° C. to +85° C., and is particularly suitable for the camera fields with relatively harsh environments, such as sports cameras and vehicle cameras.

These or other aspects of the disclosure will become apparent and understandable in the description of the following embodiments.

BRIEF DESCRIPTION OF THE DRAWINGS

In order to explain the technical solutions in the embodiments of the disclosure more clearly, the drawings used in the description of the embodiments are briefly introduced below. Obviously; the following drawings just illustrate some embodiments of the disclosure. For those skilled in the art, other drawings can be obtained based on these drawings without creative work.

MAIN REFERENCE NUMERALS

| Wide-angle lens | 100 | First lens group | Q1 |
| First lens | L1 | Second lens | L2 |
| Third lens | L3 | Second lens group | Q2 |
| Fourth lens | L4 | Fifth glass | L5 |
| Sixth lens | L6 | Stop | ST |
| Filter | G | Flat glass | P1 |
| Imaging plane | P2 | Cemented doublet | Q3 |

DETAILED DESCRIPTION OF PREFERRED EMBODIMENTS

Hereinafter, embodiments of the disclosure will be described in detail. Examples of the embodiments are illustrated in the drawings, wherein the same or similar reference numerals represent the same or similar elements or elements having the same or similar functions. The embodiments described below with reference to the drawings are exemplary and are only used to explain the disclosure, but should not be construed to limit the disclosure.

At present, with the development of autonomous driving, the requirements for vehicle lenses are becoming higher and higher, the requirements include high light transmission ability, high imaging clarity, and good thermal stability. However, most conventional vehicle lenses are sensitive to temperature, not suitable for high or low temperature occasions. In addition, it is difficult to ensure the stability of long-term use of plastic material, because plastic material is greatly affected by temperature and has a short service life; meanwhile, it has low resolution and difficult to eliminate chromatic aberration, which is not conducive to practical application.

In order to solve the above problems, after research, the inventors propose a wide-angle lens, an imaging device, a camera module, and a vehicle camera of the embodiments of the disclosure, which have the advantages of high imaging quality and good thermal reliability.

In order to enable those skilled in the art to better understand the solutions of the disclosure, the technical solutions in the embodiments of the disclosure will be clearly and completely described below with reference to the accompanying drawings in the embodiments of the disclosure. Obviously, the described embodiments are only some embodiments but not all embodiments of the disclosure. Based on the embodiments of the disclosure, all other embodiments obtained by those skilled in the art without making creative work fall into the protection scope of the disclosure.

Figure 1:
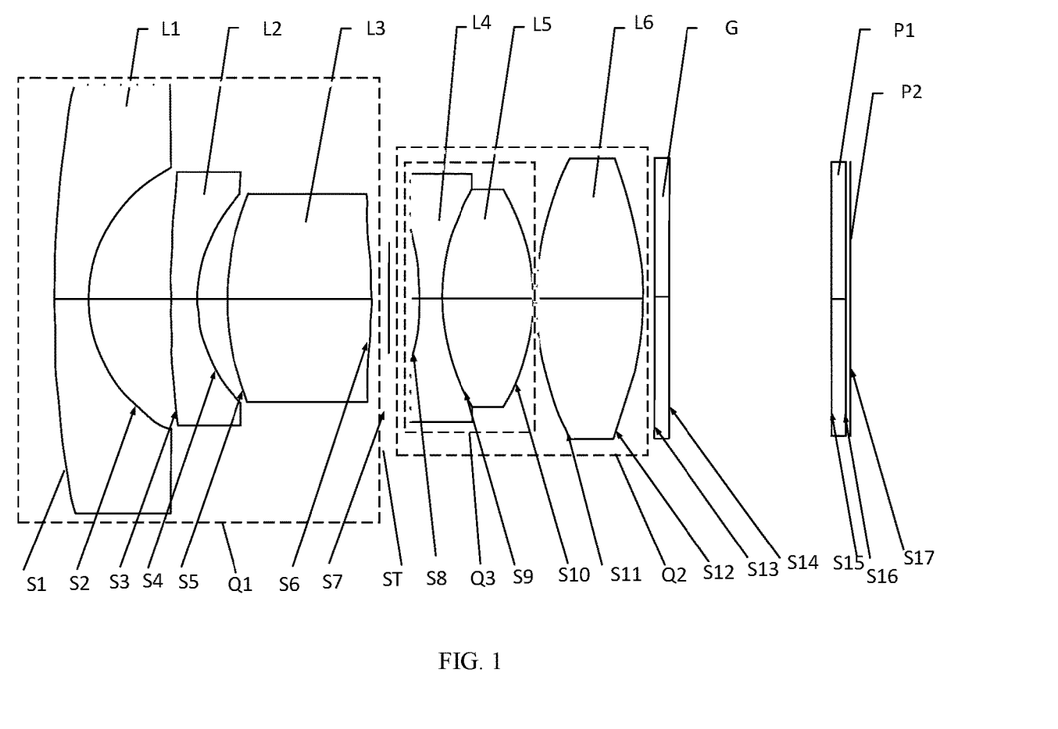
FIG. 1 is a schematic cross-sectional view of a wide-angle lens according to a first embodiment of the disclosure.

Please refer to FIG. 1, FIG. 1 is a schematic cross-sectional view of a wide-angle lens 100 according to a first embodiment of the disclosure. From an object side to an image side along an optical axis, the wide-angle lens sequentially includes a first lens group Q1, a second lens group Q2, a stop ST, a filter G, a flat glass P1, and an imaging plane P2.

The first lens group Q1 has a refractive power, and includes a first lens L1 with a negative refractive power, a second lens L2 with a negative refractive power and a third lens L3 with a positive refractive power from the object side surface to the image side surface. The first lens L1 and the second lens L2 both adopt a meniscus structure. Specifically, as illustrated in FIG. 1, an object side surface S1 of the first lens L1 is convex, an image side surface S2 of the first lens L1 is concave, an object side surface S3 of the second lens L2 is convex, an image side surface S4 of the second lens L2 is concave. An object side surface S5 and an image side surface S6 of the third lens L3 are both convex. That is, the first lens L1 is a meniscus lens, the second lens L2 is a meniscus lens, and the third lens is a bi-convex lens.

The second lens group Q2 has a positive refractive power, and includes a fourth lens L4 with a negative refractive power, a fifth lens L5 with a positive refractive power and a sixth lens L6 with a positive refractive power. An object side surface S8 and an image side surface S9 of the fourth lens L4 are both concave. An object side surface S9 and an image side surface S10 of the fifth lens L5 are both convex. An object side surface S11 and an image side surface S12 of the sixth lens L6 are both convex. That is, the fourth lens L4 is a bi-concave lens, the fifth lens L5 is a bi-convex lens, and the sixth lens L6 is a bi-convex lens.

The first lens L1, the second lens L2, the third lens L3, the fourth lens L4, the fifth lens L5 and the sixth lens L6 each are glass lenses, that is, each of the first lens L1, the second lens L2, the third lens L3, the fourth lens IA, the fifth lens L5 and the sixth lens L6 is made of glass material.

The optical center of every lens is located on the same straight line.

In addition, the fourth lens L4 and the fifth lens L5 are combined to form a cemented doublet Q3, that is, the cemented doublet Q3 is formed by cementing the fourth lens IA and the fifth lens L5. In this embodiment, the cemented doublet Q3 is mainly configured to improve the luminous flux of the wide-angle lens 100, reduce the difficulty of assembling, and reduce the tolerance sensitivity.

The stop ST is disposed between the first lens group Q1 and the second lens group Q2.

The filter G is disposed between the sixth lens L6 and the imaging plane P2. The filter G is configured for selectively filtering some light thereby optimizing the imaging result. A plate glass P1 is disposed between the sixth lens L6 and the imaging plane P2, the plate glass P1 is located behind the filter G. In this embodiment, the imaging plane P2 may be the plane where light incident from the object side and passed through the wide-angle lens 100 imaged on the image side.

Further, in some embodiments, the wide-angle lens 100 meets the expression:

$-10<\varphi_2/\varphi_1<6$, where $\varphi_2$ represents a refractive power of the second lens L2, $\varphi_1$ represents a refractive power of the first lens group Q1. Satisfying this expression can effectively correct the f-θ distortion of the wide-angle lens 100.

Further, in some embodiments, the wide-angle lens 100 meets the expression:

$-15\times10^{-6}/°$ C.$<(dN/dT)_2+(dN/dT)_6<2\times10^{-6}/°$ C.

where $(dN/dT)_2$ represents a temperature coefficient of refractive index of the second lens L2, $(dN/dT)_6$ represents a temperature coefficient of refractive index of the sixth lens L6. Satisfying this expression can effectively compensate for the effect of temperature changes on the focal length of the wide-angle lens 100, and improve the stability of the resolution of the wide-angle lens 100 under different temperatures.

Further, in some embodiments, the wide-angle lens 100 meets the expression:

$0.3<\varphi_{II}/\varphi<0.8$, where $\varphi_{II}$ represents a refractive power of the second lens group Q2, $\varphi$ represents a refractive power of the wide-angle lens 100. By satisfying this expression, the astigmatism of the wide-angle lens 100 can be effectively corrected, and the resolution of the wide-angle lens 100 can be improved.

Further, in some embodiments, the wide-angle lens 100 meets the expression:

$-0.1<\varphi_2/r_{21}<0$, where $\varphi_2$ represents a refractive power of the second lens L2, $r_{21}$ represents a radius of curvature of the object side surface S3 of the second lens L2. By satisfying this expression, the sensitivity of the lens performance caused by the curvature radius change of the second lens L2, can be reduced; it facilitates the production and processing of lens components and improves the assembly yield.

Further, in some embodiments, the wide-angle lens 100 meets the expression:

$0\leq(|\Delta IH/\Delta\theta|_{max}-|\Delta IH/\Delta\theta|_{min})/(f^*\tan(\Delta\theta))\leq0.25$, where $\Delta IH$ represents a change of image height of the wide-angle lens 100, $\Delta\theta$ represents a change of half-FOV of the wide-angle lens 100, $|\Delta IH/\Delta\theta|_{max}$ represents the maximum angular resolution, $|\Delta IH/\Delta\theta|_{min}$ represents the minimum angular resolution, f represent an effective focal length of the wide-angle lens 100. This expression reflects the consistency of the ratio of the change in the image height to the change in the half-FOV, which facilitates to perform digital distortion correction on the formed image.

In this embodiment, as an implementation manner, the first lens L1, the second lens L2, the third lens L3, the fourth lens L4, the fifth lens L5 and the sixth lens L6 are all spherical lenses. In another embodiment, the sixth lens L6 may be an aspherical lens while the other lenses L1-L5 are spherical lenses. It can be understood that, in other possible implementation manners, the first lens L1, the second lens L2, the third lens L3, the fourth lens L4, the fifth lens L5, and the sixth lens L6 may also be other combination of spherical lenses and aspherical lenses.

In the application, surface shapes of aspherical lenses meet the following expression:

$$z = \frac{ch^2}{1+\sqrt{1-(1+K)c^2h^2}} + Bh^4 + Ch^6 + Dh^8 + Eh^{10} + Fh^{12},$$

where z represents a vector height between a point on a curved surface and a vertex of the curved surface along an optical axis, c represents a curvature of the vertex of the curved surface, K represents a quadratic surface coefficient, h represents a distance between the point on the curved surface and the optical axis, B represents a fourth order surface coefficient, C represents a sixth order surface coefficient, D represents an eighth order surface coefficient, E represents a tenth order surface coefficient, F represents a twelfth order surface coefficient.

Further, in some embodiments, an F number of the wide-angle lens 100 is not greater than 1.8, which can meet the imaging requirements in a relatively dark environment. Further, in some embodiments, the FOV of the wide-angle lens 100 is between 80° and 140°, that is, the FOV of the wide-angle lens 100 can reach more than 130°, the f-θ distortion can be effectively corrected and controlled less than 5%, which facilitates to perform digital distortion correction on the formed image.

Further, a total optical length is between 20 mm-23 mm.

Further, in some embodiments, the wide-angle lens 100 meets the expression:

$d_{12}>d_{23}>d_{56}$;

where $d_{12}$ represents a distance between the first lens and the second lens on the optical axis, $d_{23}$ represents a distance between the second lens and the third lens on the optical axis, $d_{56}$ represents a distance between the fifth lens and the sixth lens on the optical axis.

Further, in some embodiments, the wide-angle lens 100 meets the expression:

$D_1>D_2>D_3$;

$D_6>D_5$;

where $D_1$ represents the maximum diameter of the first lens, $D_2$ represents the maximum diameter of the second lens, $D_3$ represents the maximum diameter of the third lens, $D_5$ represents the maximum diameter of the fifth lens, $D_6$ represents the maximum diameter of the sixth lens.

In the wide-angle lens 100 provided by the embodiment, the first lens, the second lens, the third lens, the fourth lens, the fifth lens, and the sixth lens are all glass lenses, due to the stable performance of the glass lenses, it can achieve the athermalization over a wide temperature range. The wide-angle lens 100 provided by the embodiment can clearly image in a temperature range of −40° C. to +85° C., and is particularly suitable for the camera fields with relatively harsh environments, such as sports cameras and vehicle cameras. In addition, the wide-angle lens 100 may include one or more aspherical lenses, the use of the aspherical lens can effectively correct aberrations of the wide-angle lens 100 and improve the resolution of the entire group of the wide-angle lens 100.

Further, the disclosure further provides an imaging device, which includes the wide-angle lens 100 provided in any one of the foregoing embodiments and an imaging element for converting an optical image formed by the wide-angle lens 100 into electrical signals. The imaging element may be a complementary metal oxide semiconductor (CMOS) image sensor or a charge coupled device (CCD) image sensor. The imaging device may be a device such as a vehicle-mounted device, a monitoring device, and the like, and it has the beneficial effects brought by the wide-angle lens 100 provided by the disclosure.

Embodiment 1

Please refer to FIG. 1, it is a schematic cross-sectional view of a wide-angle lens 100 according to a first embodiment of the disclosure. The sixth lens L6 is a glass spherical lens. Relevant parameters of every lens of the wide-angle lens 100 are shown in Table 1.

TABLE 1

| | Surface No. | Surface type | Radius of curvature | Thickness | Refractivity | Abbe number |
|---|---|---|---|---|---|---|
| Object | | | — | Infinity | | |
| First lens L1 | S1 | Spherical surface | 9.111 | 1.20 | 1.804 | 46.6 |
| | S2 | Spherical surface | 3.413 | 3.65 | | |
| Second lens L2 | S3 | Spherical surface | 89.542 | 1.50 | 1.497 | 81.6 |
| | S4 | Spherical surface | 3.416 | 0.83 | | |
| Third lens L3 | S5 | Spherical surface | 5.523 | 2.68 | 1.923 | 18.9 |
| | S6 | Spherical surface | −32.323 | 0.14 | | |
| Stop ST | S7 | | — | 0.31 | | |
| Fourth lens L4 | S8 | Spherical surface | −19.947 | 0.65 | 1.946 | 17.9 |
| Fifth lens L5 | S9 | Spherical surface | 4.495 | 2.20 | 1.62 | 17.9 |
| | S10 | Spherical surface | −4.889 | 0.096 | | |
| Sixth lens L6 | S11 | Spherical surface | 11.567 | 3.12 | 1.768 | 49.2 |
| | S12 | Spherical surface | −16.978 | 0.30 | | |
| Filter G | S13 | | — | 0.400 | 1.517 | 64.21 |
| | S14 | | — | 5.30 | | |
| Plate glass P1 | S15 | | — | 0.50 | 1.517 | 64.21 |
| | S16 | | — | 0.125 | | |
| Imaging plane P2 | S17 | | — | — | | |

Figure 2:
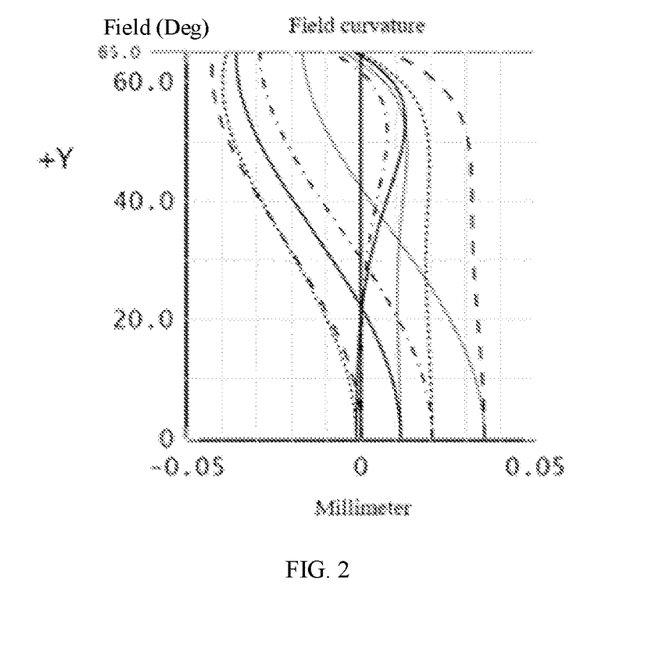
FIG. 2 is a diagram showing field curvature curves of the wide-angle lens according to the first embodiment of the disclosure.
Figure 3:
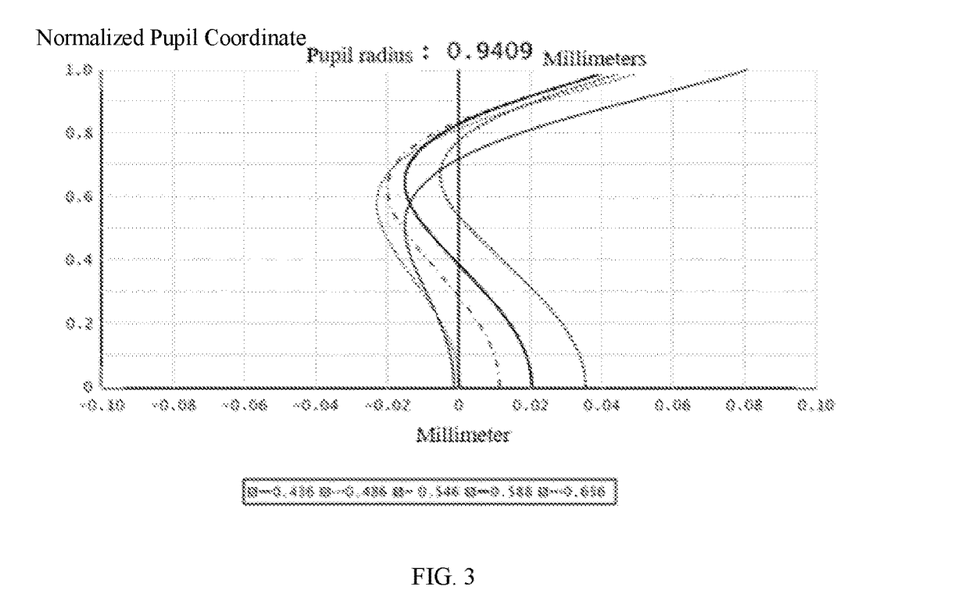
FIG. 3 is a diagram showing axial spherical aberration curves of the wide-angle lens according to the first embodiment of the disclosure.
Figure 4:
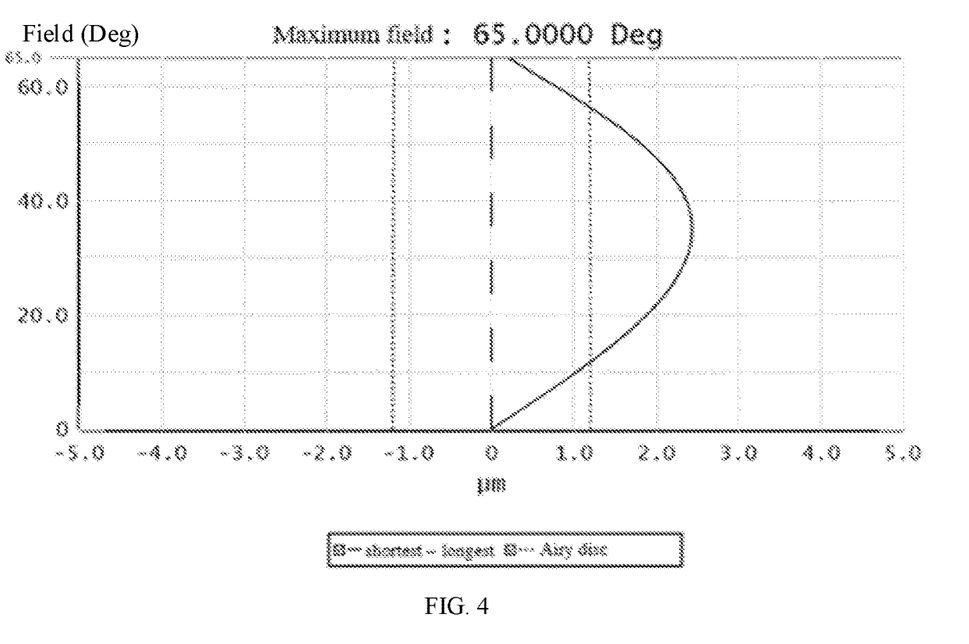
FIG. 4 is a diagram showing lateral chromatic aberration curves of the wide-angle lens according to the first embodiment of the disclosure.

In this embodiment, the curves of the field curvature, the axial spherical aberration and the lateral chromatic aberration are shown in FIG. 2, FIG. 3, and FIG. 4, respectively. From FIG. 2 to FIG. 4, it is apparent that the field curvature, the axial spherical aberration and the lateral chromatic aberration can be well corrected.

Embodiment 2

A wide-angle lens 100 of this embodiment is substantially similar to the wide-angle lens 100 of the first embodiment. The main differences are the design parameters, and another difference is that: a first lens L1, a second lens L2, a third lenses L3, a fourth lens L4 and a fifth lens L5 of this are all spherical lenses, while a sixth lens L6 of this embodiment is an aspheric lens. Relevant parameters of every lens of the wide-angle lens 100 are shown in Table 2-1 and 2-2.

TABLE 2-1

| | Surface No. | Surface type | Radius of curvature | Thickness | Refractivity | Abbe number |
|---|---|---|---|---|---|---|
| Object | | | — | Infinity | | |
| First lens L1 | S1 | Spherical surface | 15.888 | 1.20 | 1.569 | 56.0 |
| | S2 | Spherical surface | 3.611 | 2.61 | | |
| Second lens L2 | S3 | Spherical surface | 1243.35 | 0.80 | 1.497 | 81.6 |
| | S4 | Spherical surface | 4.165 | 0.64 | | |
| Third lens L3 | S5 | Spherical surface | 7.122 | 3.16 | 2.001 | 25.4 |
| | S6 | Spherical surface | −21.368 | 0.15 | | |
| Stop ST | S7 | | — | 0.67 | | |
| Fourth lens L4 | S8 | Spherical surface | −7.175 | 0.65 | 1.847 | 23.8 |
| Fifth lens L5 | S9 | Spherical surface | 5.476 | 2.55 | 1.755 | 52.3 |
| | S10 | Spherical surface | −5.666 | 0.10 | | |
| Sixth lens L6 | S11 | Aspherical surface | 6.776 | 3.37 | 1.497 | 81.6 |
| | S12 | Aspherical surface | −8.612 | 0.30 | | |
| Filter G | S13 | | — | 0.40 | 1.517 | 64.21 |
| | S14 | | — | 4.285 | | |
| Plate glass P1 | S15 | | — | 0.40 | 1.517 | 64.21 |
| | S16 | | — | 0.125 | | |
| Imaging plane P2 | S17 | | — | — | | |

In this embodiment, aspherical parameters of every lens of the optical imaging lens 100 are shown in Table 2-2.

TABLE 2-2

| Surface No. | K | B | C | D | E | F |
|---|---|---|---|---|---|---|
| S11 | −0.332 | −5.556e−4 | 7.015e−5 | −3.241e−6 | 1.517e−7 | 1.054e−10 |
| S12 | −1.325 | 1.050e−3 | −6.860e−5 | 1.659e−5 | −1.224e−6 | 4.111e−8 |

Figure 5:
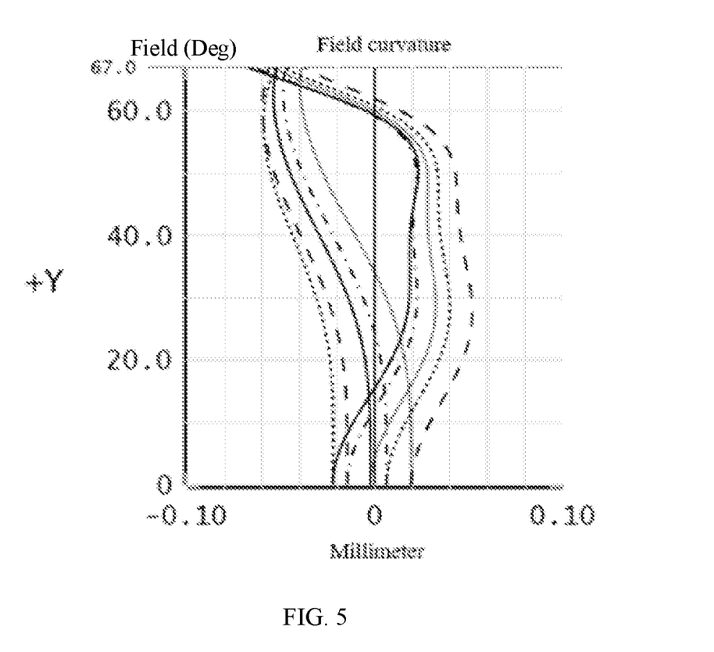
FIG. 5 is a diagram showing field curvature curves of the wide-angle lens according to a second embodiment of the disclosure.
Figure 6:
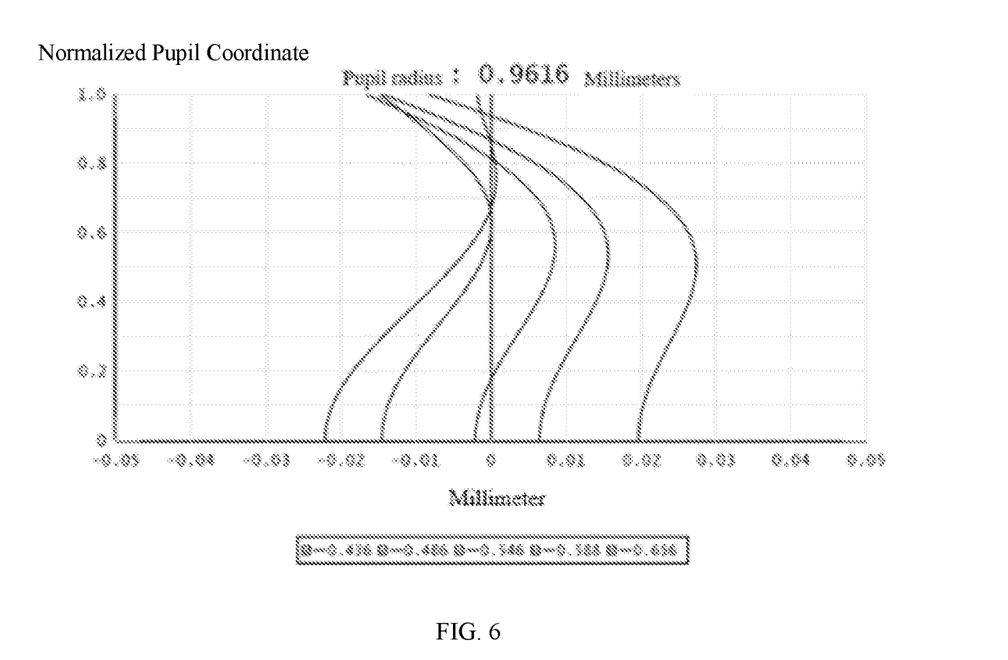
FIG. 6 is a diagram showing axial spherical aberration curves of the wide-angle lens according to the second embodiment of the disclosure.
Figure 7:
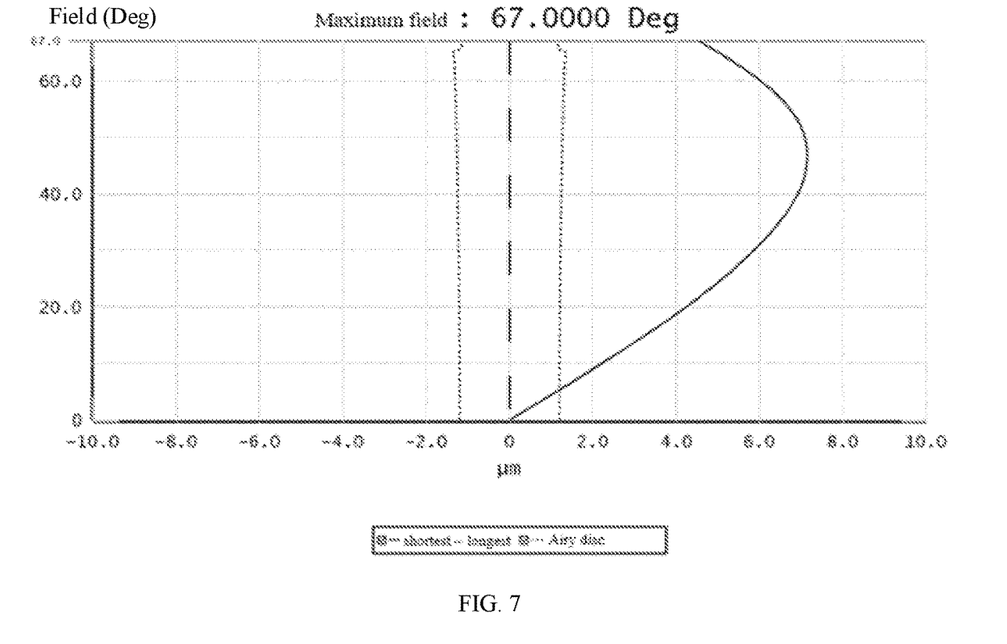
FIG. 7 is a diagram showing lateral chromatic aberration curves of the wide-angle lens according to the second embodiment of the disclosure.

In this embodiment, the curves of the field curvature, the axial spherical aberration and the lateral chromatic aberration are shown in FIG. 5, FIG. 6, and FIG. 7, respectively. From FIG. 5 to FIG. 7, it is apparent that the field curvature, the axial spherical aberration and the lateral chromatic aberration can be well corrected.

In this embodiment, a hybrid structure of five glass spherical lenses and one glass aspherical lens can realize clear imaging in a temperature range of −40° C. to +85° C., improve ghost images generated on an optical element surface near the imaging plane, and meet the requirements of wide-angle performance and high imaging quality.

Embodiment 3

A wide-angle lens 100 of this embodiment is substantially similar to the wide-angle lens 100 of the first embodiment, and the difference is that: a sixth lens L6 of this embodiment is a glass aspheric lens. The design parameters of the wide-angle lens of this embodiment are different from that of the second embodiment. Relevant parameters of every lens in the wide-angle lens 100 are shown in Tables 3-1 to 3-2.

TABLE 3-1

| | Surface No. | Surface type | Radius of curvature | Thickness | Refractivity | Abbe number |
|---|---|---|---|---|---|---|
| Object | | | — | Infinity | | |
| First lens L1 | S1 | Spherical surface | 27.223 | 1.20 | 1.49 | 70.4 |
| | S2 | Spherical surface | 3.594 | 2.19 | | |
| Second lens L2 | S3 | Spherical surface | 25.645 | 0.80 | 1.49 | 70.4 |
| | S4 | Spherical surface | 3.915 | 0.70 | | |
| Third lens L3 | S5 | Spherical surface | 7.539 | 2.52 | 1.92 | 20.9 |
| | S6 | Spherical surface | −27.943 | 0.26 | | |
| Stop ST | S7 | | — | 0.51 | | |
| Fourth lens L4 | S8 | Spherical surface | −6.233 | 0.65 | 1.85 | 23.8 |
| Fifth lens L5 | S9 | Spherical surface | 5.897 | 2.46 | 1.73 | 54.6 |
| | S10 | Spherical surface | −5.284 | 0.10 | | |
| Sixth lens L6 | S11 | Aspherical surface | 7.516 | 3.65 | 1.50 | 81.6 |
| | S12 | Aspherical surface | −5.758 | 0.3 | | |
| Filter G | S13 | | — | 0.40 | 1.517 | 64.21 |
| | S14 | | — | 4.78 | | |
| Plate glass P1 | S15 | | — | 0.40 | 1.517 | 64.21 |
| | S16 | | — | 0.125 | | |
| Imaging plane P2 | S17 | | — | — | | |

In this embodiment, aspherical parameters of every lens of the optical imaging lens 100 are shown in Table 3-2.

TABLE 3-2

| Surface No. | K | B | C | D | E | F |
|---|---|---|---|---|---|---|
| S11 | −5.495 | 4.095e−4 | 5.437e−6 | −1.092e−6 | 5.787e−8 | −3.022e−11 |
| S12 | −0.995 | 4.600e−4 | −2.163e−5 | 2.756e−6 | −1.562e−7 | 4.614e−9 |

Figure 8:
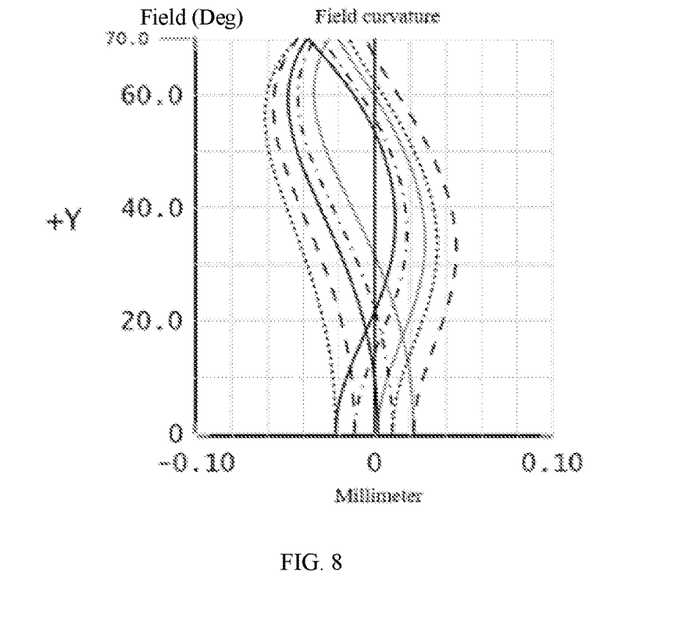
FIG. 8 is a diagram showing field curvature curves of the wide-angle lens according to a third embodiment of the disclosure.
Figure 9:
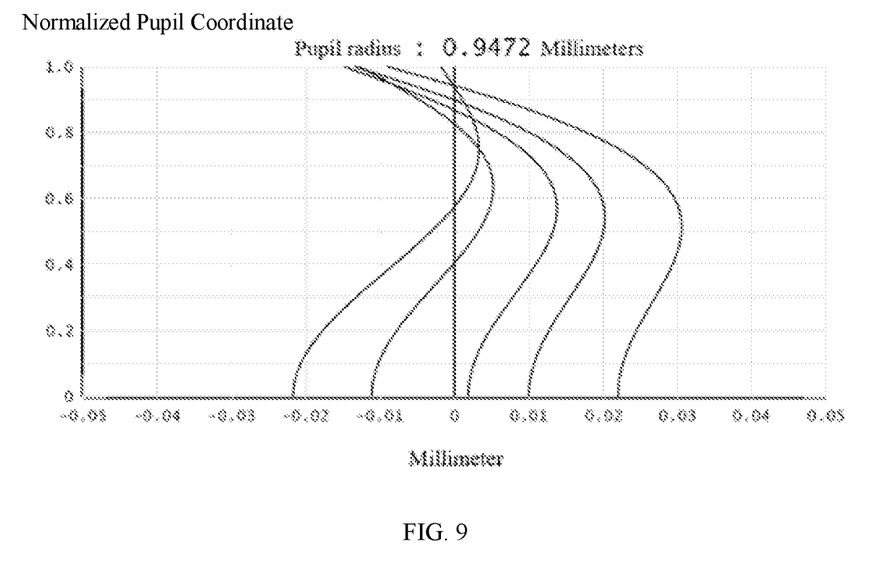
FIG. 9 is a diagram showing axial spherical aberration curves of the wide-angle lens according to the third embodiment of the disclosure.
Figure 10:
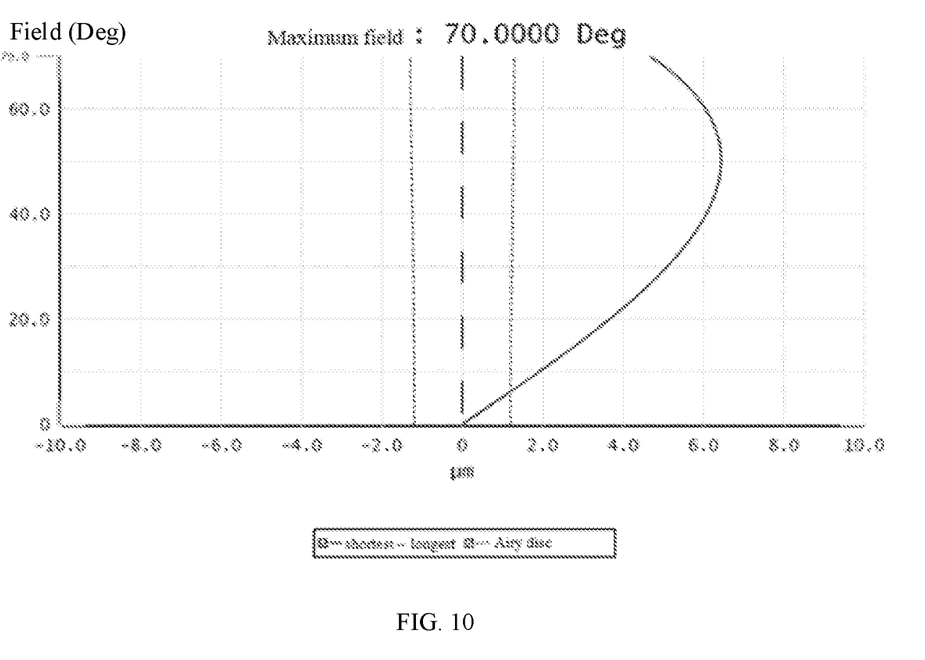
FIG. 10 is a diagram showing lateral chromatic aberration curves of the wide-angle lens according to the third embodiment of the disclosure.

In this embodiment, the curves of the field curvature, the axial spherical aberration and the lateral chromatic aberration are shown in FIG. 8, FIG. 9, and FIG. 10, respectively. From FIG. 8 to FIG. 10, it is apparent that the field curvature, the axial spherical aberration and the lateral chromatic aberration can be well corrected.

Table 4 shows the corresponding optical characteristics of the optical imaging lens 100 in the above three embodiments, including the focal length f, the F number F #, the field of view 2θ, the total optical length $T_L$, and related values corresponding to the aforementioned expressions.

TABLE 4

| expression | Embodiment 1 | Embodiment 2 | Embodiment 3 |
|---|---|---|---|
| f (mm) | 3.387 | 3.462 | 3.41 |
| F# | 1.8 | 1.8 | 1.8 |
| 2θ | 130° | 134° | 140° |
| $T_L$ (mm) | 22.93 | 21.4 | 21 |
| $\varphi_2/\varphi_I$ | −9.31 | −8.43 | 5.23 |
| $(dN/dT)_2 + (dN/dT)_6$ | 0.4 × 10⁻⁶/° C. | −12.1 × 2.0⁻⁶/° C. | −7.3 × 10⁻⁶/° C. |
| $\varphi_{II}/\varphi$ | 0.511 | 0.609 | 0.649 |
| $\varphi_2/r_{21}$ | −0.049 | −0.005 | −0.350 |
| $|\Delta IH/\Delta\theta|_{max}$ | 0.0593 | 0.0604 | 0.0595 |
| $|\Delta IH/\Delta\theta|_{min}$ | 0.0591 | 0.0580 | 0.0458 |
| $(|\Delta IH/\Delta\theta|_{max} - |\Delta IH/\Delta\theta|_{min})/(f*\tan(\Delta\theta))$ | 0.0338 | 0.0397 | 0.2328 |

According to Table 4, the total optical length of the wide-angle lens 100 is less than 23 mm, the F number F # is 1.8, and the FOV 2θ is 130°~140°.

The wide-angle lens 100 of the present application has a small volume, the sixth lens L6 is designed to be a glass aspheric lens, which effectively reduces the aberration and improves the imaging quality of the wide-angle lens 100. By appropriately matching the temperature coefficient of refractive index of the second lens L2 and the sixth lens L6, the problem of focus shift caused by refractive index changes with temperature is solved, so that the wide-angle lens 100 has good imaging effects in various temperature occasions, and the practicability of the wide-angle lens 100 is improved.

Embodiment 4

Figure 11:
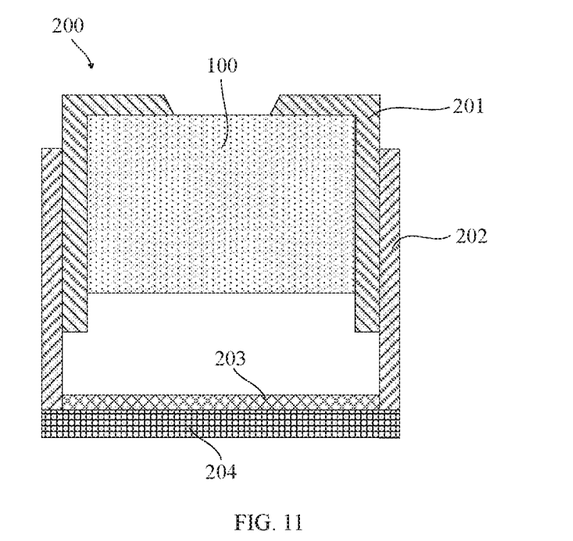
FIG. 11 is a schematic structural diagram showing a cross-section of a camera module according to a fourth embodiment of the disclosure.

FIG. 11 illustrates a camera module 200, which includes the wide-angle lens 100 of any embodiment as described above, a barrel 201, a holder 202, an image sensor 203, and a printed circuit board 204. The wide-angle lens 100 is received in the barrel 201, and the barrel 201 is engaged with the holder 202. The image sensor 203 and the printed circuit board 204 are substantially accommodated in the holder 202. The image sensor 203 is opposite to the wide-angle lens 100 and is mounted on the printed circuit board 204. The image sensor 203 is configured for converting light signals into electrical signals, thereby the images formed by the wide-angle lens 100 can be converted and transmitted to a processor. The printed circuit board 204 can be further electrically connected to a chip or the processor via a flexible circuit board.

Embodiment 5

Figure 12:
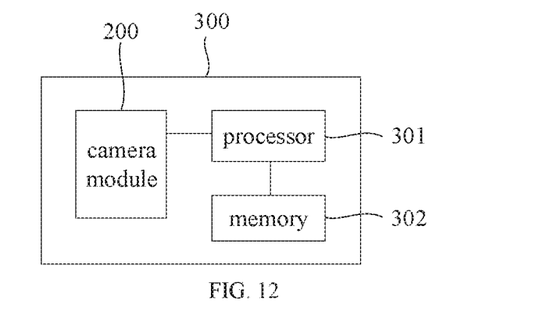
FIG. 12 is a schematic block diagram of a vehicle camera according to a fifth embodiment of the disclosure.
Figure 13:
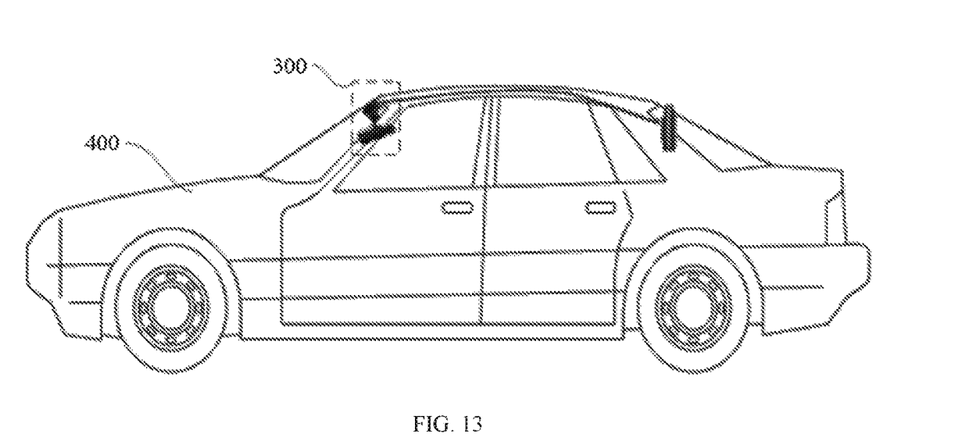
FIG. 13 is a schematic diagram of the vehicle camera according to the fifth embodiment of the disclosure.

FIGS. 12 and 13 illustrates a vehicle camera 300, which includes the camera module 200 as described above, a processor 301, and a memory 302. The camera module 200 is configured to capture images of the surroundings, the processor 301 is configured to process the captured images, and the memory 302 is configured to store the captured images. The processor 301 is communicated with the camera module 200 and the memory 302. That is, the captured images can be transmitted to the processor 301 and stored in the memory 302. The vehicle camera 300 is installed in a car 400, and can be applied to an automatic driving system of the car 400, so that the driverless vehicle system can control the direction and the speed of the car 400 according to the captured images of the surroundings.

The above embodiments just describe some implementation manners of the disclosure, the descriptions are specific and detailed, but cannot be understood as limiting the scope of the application. It should be noted that, for those of ordinary skill in the art, without departing from the concept of the application, modifications and improvements can be made, which should belong to the protection scope of the application. Therefore, the protection scope of this application should be subject to the appended claims.

What is claimed is:

1. A wide-angle lens, from an object side to an image side, sequentially comprising:
   a first lens group with a refractive power, wherein the first lens group comprises, from the object side surface of the wide-angle lens to the image side surface of the wide-angle lens, a first lens with a negative refractive power, a second lens with a negative refractive power and a third lens with a positive refractive power, an object side surface of the first lens is convex, an image side surface of the first lens is concave, an object side surface of the second lens is convex, an image side surface of the second lens is concave, an object side surface and an image side surface of the third lens are both convex;
   a second lens group with a positive refractive power, wherein the second lens group comprises a fourth lens with a negative refractive power, a fifth lens with a positive refractive power and a sixth lens with a positive refractive power, the fourth lens and the fifth lens form a cemented doublet;
   a stop disposed between the first lens group and the second lens group;
   wherein the first lens, the second lens, the third lens, the fourth lens, the fifth lens and the sixth lens each are glass lenses, and the optical center of every lens is located on the same straight line,
   the wide-angle lens meets the expression:

$$0.3 < \varphi_{II}/\varphi < 0.8,$$

where $\varphi_{II}$ represents the refractive power of the second lens group, $\varphi$ represents a refractive power of the wide-angle lens, and
wherein the wide-angle lens meets the expression:

$$-15 \times 10^{-6}/° C. < (dN/dT)_2 + (dN/dT)_6 < 2 \times 10^{-6}/° C.,$$

where $(dN/dT)_2$ represents a temperature coefficient of refractive index of the second lens, $(dN/dT)_6$ represents a temperature coefficient of refractive index of the sixth lens.

2. The wide-angle lens as claimed in claim 1, wherein the wide-angle lens meets the expression:

$$-10 < \varphi_2/\varphi_1 < 6,$$

where $\varphi_2$ represents the refractive power of the second lens, $\varphi_1$ represents the refractive power of the first lens group.

3. The wide-angle lens as claimed in claim 1, wherein the wide-angle lens meets the expression:

$-0.1 < \varphi_2/r_{21} < 0$, where $\varphi_2$ represents the refractive power of the second lens, $r_{21}$ represents a radius of curvature of the object side surface of the second lens.

4. The wide-angle lens as claimed in claim 1, wherein the wide-angle lens meets the expression:

$0 \leq (|\Delta IH/\Delta\theta|_{max} - |\Delta IH/\Delta\theta|_{min})/(f*\tan(\Delta\theta)) \leq 0.25$, where $\Delta IH$ represents a change of image height of the wide-angle lens, $\Delta\theta$ represents a change of half-FOV of the wide-angle lens, $|\Delta IH/\Delta\theta|_{max}$ represents the maximum angular resolution, $|\Delta IH/\Delta\theta|_{min}$ represents the minimum angular resolution, f represents an effective focal length of the wide-angle lens.

5. The wide-angle lens as claimed in claim 1, wherein the first lens, the second lens, the third lens, the fourth lens, and the fifth lens each are glass spherical lenses, and the sixth lens is a glass aspherical lens.

6. The wide-angle lens as claimed in claim 1, wherein the fourth lens is a bi-concave lens, the fifth lens is a bi-convex lens, an object side surface of the sixth lens is convex.

7. The wide-angle lens as claimed in claim 1, wherein an F number of the wide-angle lens is not greater than 1.8, a field of view of the wide-angle lens is between 80°-140°, and a total optical length of the wide-angle lens is less than 23 mm.

8. The wide-angle lens as claimed in claim 1, wherein the wide-angle lens meets the expression:

$d_{12} > d_{23} > d_{56}$;

where $d_{12}$ represents a distance between the first lens and the second lens on the optical axis, $d_{23}$ represents a distance between the second lens and the third lens on the optical axis, $d_{56}$ represents a distance between the fifth lens and the sixth lens on the optical axis.

9. The wide-angle lens as claimed in claim 1, wherein the wide-angle lens meets the expressions:

$D_1 > D_2 > D_3$;

$D_6 > D_5$;

where $D_1$ represents the maximum diameter of the first lens, $D_2$ represents the maximum diameter of the second lens, $D_3$ represents the maximum diameter of the third lens, $D_5$ represents the maximum diameter of the fifth lens, $D_6$ represents the maximum diameter of the sixth lens.

10. A camera module, comprising a wide-angle lens and an image sensor opposite to the wide-angle lens, wherein, from an object side to an image side, the wide-angle lens sequentially comprises:

a first lens group comprising a first lens, a second lens and a third lens, wherein the first lens has a negative refractive power, a convex object side surface and a concave image side surface, the second lens has a negative refractive power, a convex object side surface and a concave image side surface, the third lens has a positive refractive power, a convex object side surface and a convex image side surface;

a stop;

a second lens group comprising a cemented doublet and a sixth lens, wherein the cemented doublet comprises a fourth lens with a negative refractive power and a fifth lens with a positive refractive power, the sixth lens has a positive refractive power and a convex object side surface;

wherein the first lens, the second lens, the third lens, the fourth lens, and the fifth lens each are glass spherical lenses, and the sixth lens is a glass aspherical lens, and wherein the wide-angle lens meets the expression:

$-15 \times 10^{-6}/° C. < (dN/dT)_2 + (dN/dT)_6 < 2 \times 10^{-6}/° C.$ where $(dN/dT)_2$ represents a temperature coefficient of refractive index of the second lens, $(dN/dT)_6$ represents a temperature coefficient of refractive index of the sixth lens.

11. The camera module as claimed in claim 10, wherein the wide-angle lens meets the expression:

$-10 < \varphi_2/\varphi_1 < 6$, where $\varphi_2$ represents the refractive power of the second lens, $\varphi_1$ represents a refractive power of the first lens group.

12. The camera module as claimed in claim 10, wherein the wide-angle lens meets the expression:

$$0.3 < \varphi_{II}/\varphi < 0.8,$$

where $\varphi_{II}$ represents a refractive power of the second lens group, $\varphi$ represents a refractive power of the wide-angle lens.

13. The camera module as claimed in claim 10, wherein the wide-angle lens meets the expression:

$-0.1 < \varphi_2/r_{21} < 0$, where $\varphi_2$ represents the refractive power of the second lens, $r_{21}$ represents a radius of curvature of the object side surface of the second lens.

14. The camera module as claimed in claim 10, wherein the fourth lens is a bi-concave lens, the fifth lens is a bi-convex lens, the sixth lens is a bi-convex lens, an F number of the wide-angle lens is not greater than 1.8, a field of view of the wide-angle lens is between 80°- 140°, and a total optical length of the wide-angle lens is less than 23 mm.

15. The camera module as claimed in claim 10, wherein the wide-angle lens meets the expressions:

$d_{12} > d_{23} > d_{56}$;

$D_1 > D_2 > D_3$;

$D_6 > D_5$;

where $d_{12}$ represents a distance between the first lens and the second lens on the optical axis, $d_{23}$ represents a distance between the second lens and the third lens on the optical axis, $d_{56}$ represents a distance between the fifth lens and the sixth lens on the optical axis; $D_1$ represents the maximum diameter of the first lens, $D_2$ represents the maximum diameter of the second lens, $D_3$ represents the maximum diameter of the third lens, $D_5$ represents the maximum diameter of the fifth lens, $D_6$ represents the maximum diameter of the sixth lens.

* * * * *